United States Patent [19]
Nagpal et al.

[11] Patent Number: 5,226,444
[45] Date of Patent: Jul. 13, 1993

[54] SURGE RELIEF VALVE

[75] Inventors: Vinay K. Nagpal, San Clemente; Curtis G. Sterud, Garden Grove; Laurence R. Stratton, Anaheim, all of Calif.

[73] Assignee: Control Components Inc., Rancho Santa Margarita, Calif.

[21] Appl. No.: 962,064

[22] Filed: Oct. 16, 1992

Related U.S. Application Data

[63] Continuation of Ser. No. 731,617, Jul. 17, 1991, abandoned.

[51] Int. Cl.$^5$ .............................................. G05D 16/10
[52] U.S. Cl. .................................. 137/488; 251/61.5; 251/127; 251/282
[58] Field of Search ............... 251/282, 63, 127, 61.5; 137/488

[56] References Cited

U.S. PATENT DOCUMENTS

| | | |
|---|---|---|
| 3,331,583 | 7/1967 | Baker .......................... 251/282 X |
| 3,514,074 | 5/1970 | Self . |
| 4,127,146 | 11/1978 | Self .............................. 251/127 X |
| 4,167,262 | 11/1979 | Lemmon . |
| 4,172,466 | 10/1979 | Pattarini .......................... 137/488 |
| 4,267,045 | 5/1981 | Hoof . |
| 4,356,843 | 11/1982 | Baumann ...................... 251/127 X |
| 4,397,331 | 8/1983 | Medlar . |

FOREIGN PATENT DOCUMENTS

| | | |
|---|---|---|
| 0167252 | 5/1985 | European Pat. Off. . |
| 7135776 | 9/1971 | Fed. Rep. of Germany . |
| 1650286 | 12/1971 | Fed. Rep. of Germany . |
| 2733854 | 4/1978 | Fed. Rep. of Germany . |

Primary Examiner—Robert G. Nilson
Attorney, Agent, or Firm—Cushman, Darby & Cushman

[57] ABSTRACT

A surge relief valve suitable for high pressure application, for example in a crude oil pumped pipeline. The valve has a plug movable to expose different areas of an energy-absorbing cage trim to fluid flow. The plug position is controlled by a control device proportionately responsive to changes in upstream fluid pressure. The valve requires no external power for its actuation.

11 Claims, 3 Drawing Sheets

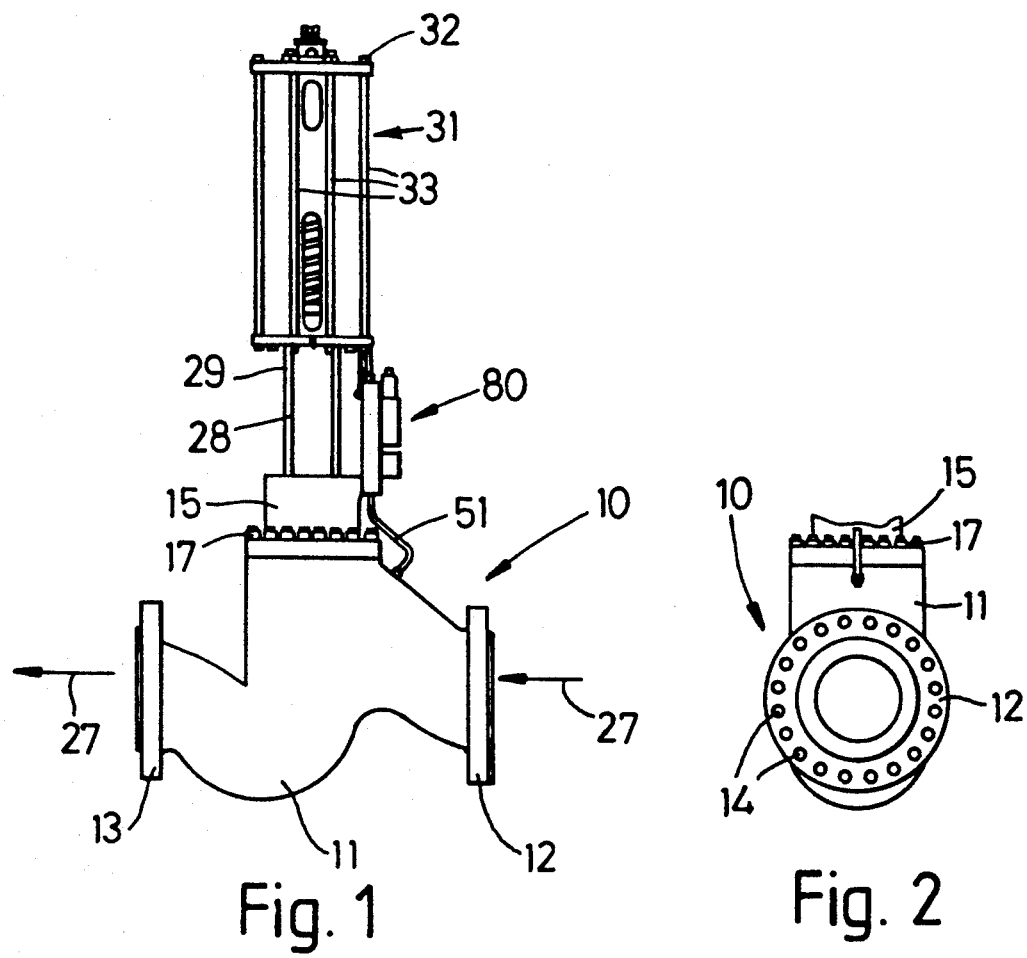
Fig. 1
Fig. 2
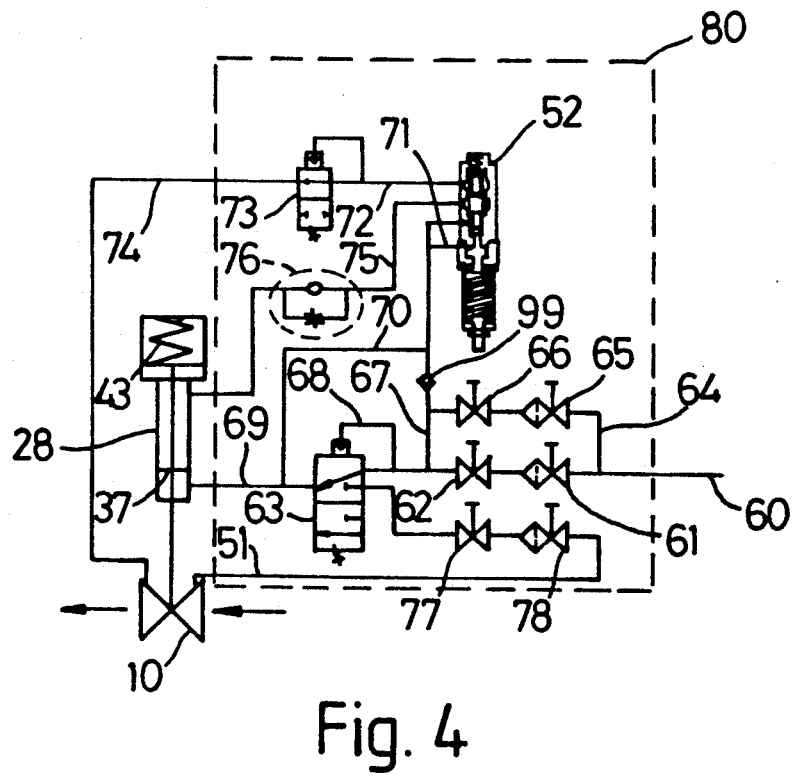
Fig. 4

SURGE RELIEF VALVE

This is a continuation of Application No. 07/731,617, filed on Jul. 17, 1991, now abandoned.

BACKGROUND OF THE INVENTION

This invention relates to a novel form of surge relief valve. Such valves are required in pipelines containing various fluids to control surging, but perhaps the most extreme requirements lie in the control of surging in high pressure crude oil pumped pipelines. Unless the surging is controlled in such lines the damage to the pipeline and its associated equipment can be environmentally catastrophic. Available anti-surge devices using line pressure to actuate them have characteristics which may under certain circumstances give rise on actuation to violent vibration and cavitation. Repeated actuation of such devices may result in damage to the devices themselves or to joints in the associated pipeline close to the device.

SUMMARY OF THE INVENTION

According to one aspect of the invention we provide a valve for a pipeline, said valve comprising a valve body housing a valve trim cage assembly adapted to provide for energy losses in fluid passing through the valve, a plug carried on a stem, said stem extending externally of the housing, control means acting on said stem to provide movement of said plug from a valve closed position in which said plug is held by resilient means against a seat carried by said valve body, through valve open positions in which the plug exposes different areas of said cage assembly to fluid flow, said control means incorporating a control device and fluid connection means adapted to connect said control device to said pipeline upstream of the valve, said control device being responsive to changes in fluid pressure upstream of said valve to actuate the control means and hence control the position the stem and plug relative to said seat, substantially in proportion to changes in said fluid pressure, said fluid control means being adapted to require only the energy associated with the fluid pressure in the pipeline in order to actuate the valve.

The valve is preferably balanced such that the pressure on either side of the plug is equalised. This may be achieved by providing diametrically spaced passageways passing axially through the plug. The cage assembly may incorporate a disc stack as in severe service valves sold under the Registered Trade Mark "DRAG" by Control Components Inc of Rancho Santa Margarita of California. Alternatively, different cage devices capable of providing controlled energy loss may be used.

The valve materials may be designed to be used with various fluids for example liquids such as crude oil or water. Additionally the valve may have connections which enable it to be connected to various types of end fitting in a pipeline. Particular details concerning allowable pressures, temperatures and connections will obviously influence the materials and exact design of any particular valve.

The valve plug may have diametrically spaced passageways passing through it, said passageways being parallel to the stem and sufficient to provide balancing of the plug by ensuring equal fluid force applied to either side of the plug.

Preferably stem balancing means is provided to ensure that any force due to fluid pressure acting on the stem is equalised to minimise the effect of changes in fluid pressure in the valve from affecting the position of the stem. The stem may be hollow so as to permit fluid pressure to be transmitted to its end distant from the plug to act on an equal area of stem as is exposed to fluid pressure as the stem leaves the valve housing. An alternative means of providing stem balancing is to incorporate a projection extending from the plug in a direction away from the stem and passing through the valve housing. The cross-sectional area of such an extension at the position where it leaves the housing would typically be identical to that of the stem where the stem leaves the housing.

The control means preferably includes a piston attached to the stem, said piston being movable within a cylinder, and also a pressure reducing regulator incorporating a spool, with the spool being movable in proportion to changes in fluid pressure so as to provide proportional venting of the cylinder associated with the piston and permit the piston, and hence the attached stem and plug, to move to a valve open position. The pressure reducing regulator may be connected to the upstream fluid supply by means of a 3-way valve actuated by changes in fluid pressure. The valve is typically located in a branch line from a main fluid pipeline with the fluid connection means being adapted to receive a connection from the main fluid pipeline. A normally redundant connection may be provided to the upstream side of the valve housing, typically into said 3-way valve, this normally redundant connection providing a passageway enabling the valve to respond to upstream pressure in the by-pass line in the event that the connection to the main pipeline is obstructed.

These and other aspects of the present invention will be more fully understood on consideration of the following description of the preferred embodiment and the drawings.

BRIEF DESCRIPTION OF THE DRAWINGS

FIG. 1 is a side elevation of a valve and its associated control equipment made in accordance with the invention, FIG. 2 is an end elevation of part of the valve shown in FIG. 1, FIG. 4 is a schematic diagram of the control equipment associated with the valve shown in FIG. 3.

DESCRIPTION OF THE PREFERRED EMBODIMENT

Figure 3A:
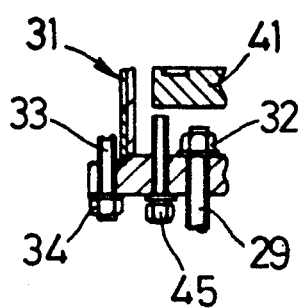
FIG. 3A shows a detail of part of FIG. 3.

FIGS. 1 and 2 show a valve 10 generally similar to a severe service valve sold under the Registered Trade Mark "DRAG" whose principal features have been disclosed in U.S. Pat. Nos. 3,513,684, 3,514,074 and 4,267,045. Such valves have a valve trim cage assembly including a stack of discs adapted to provide energy losses in the fluid passing through the valve. In this context, "trim" is given its usual meaning in the field of automatic process control valves, and applies to those internal parts which contact the fluid flow and are responsible for controlling said flow. Such parts include the plug, seating, washers, cages, stems and the like. DRAG valves in various forms have been effectively used in the past for high pressure reduction in liquid or gas flow streams with minimal cavitation and associated vibrations and damage resulting from the special cage trim and associated design of the valve. A typical stack of discs for such valves is as illustrated in U.S. Pat. No. 4,267,045.

In FIGS. 1 and 2 the valve 10 has a body 11, typically cast in special steel and made in accordance with Pressure Class 600 ANSI. Body 11 and all the other equipment associated with the valve has a maximum allowable fluid temperature of 225° F. (107° C.) and is subject to a hydro test pressure of 2225 PSIG.

Valve 10 is typically located in a by-pass line of a high pressure pumped crude oil main pipeline. There could be several such valves 10 in parallel by-pass lines and their outlets would be designed to be dumped into associated tanks, pipelines or other contaminant devices.

Body 11 carries an associated fluid inlet flange 12 and fluid outlet flange 13. These flanges 12 and 13 are adapted by means of bolt holes 14 to be attached to elements of the oil pipeline or by-pass line which is not illustrated.

A bonnet 15 is adapted to be held to body 11 by means of bonnet studs 16 and bonnet securing nuts 17.

Figure 3:
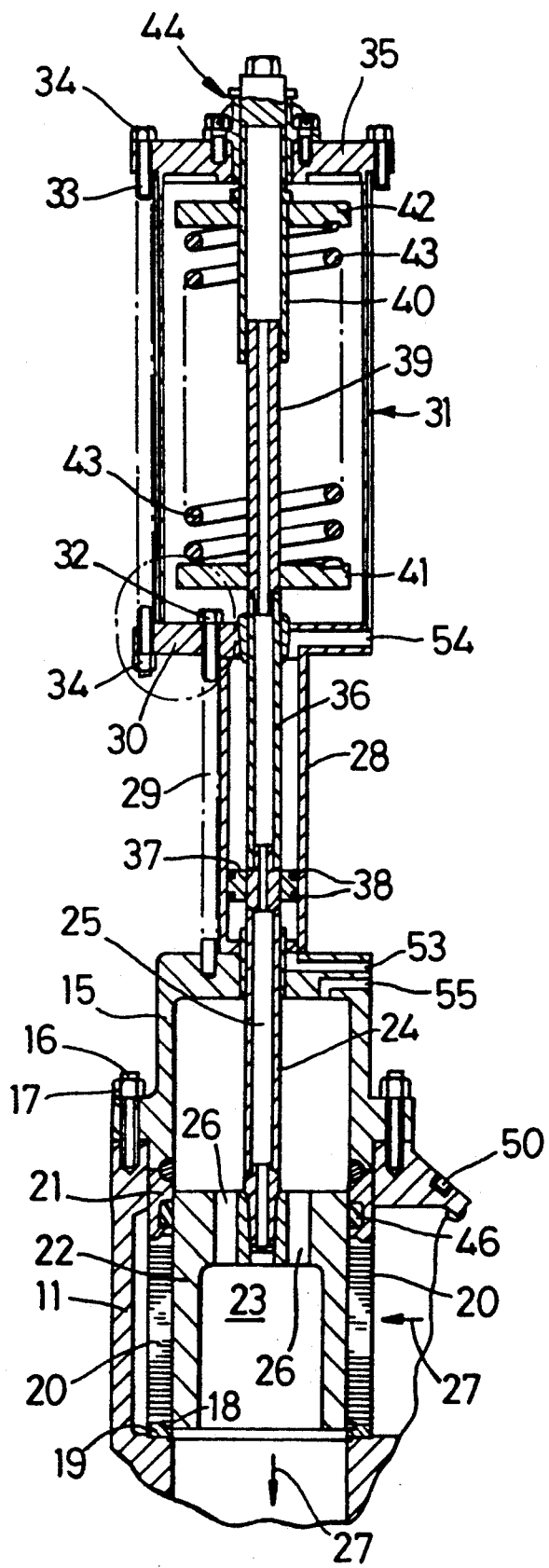
FIG. 3 is a cross-section in elevation of a substantial portion of the valve shown in FIG. 1.

As seen more clearly in FIG. 3, body 11 carries an annular seal seat 18 together with an associated annular seal 19. An annular disc stack 20 together with annular disc stack spacer 21 are located directly above seal 19 and are held in place by bonnet 15. A cylindrical plug 22 with a hollow interior 23 is movable vertically upwards and downwards inside disc stack 20 from a closed position in contact with seal seat 18, thereby making available more or less of the disc stack 20 to fluid flow. Plug 22 is carried by stem 24 which extends vertically upwards on the central axis of plug 22. Stem 24 has a circular cross-section passageway 25 along its axis which is open at both ends. Plug 22 also has a number of axially directed passageways 26 spaced radially outwardly of stem 24. These passageways 26 connect the space under bonnet 15 with the plug interior 23 and are designed to provide equal pressure on each side of plug 22. This pressure balancing significantly reduces the force required for actuation. An annular balance seal 46 is located around plug 22 to prevent leakage along the exterior of plug 22. For service up to 450° F. (232° C.) a self-energising fluorocarbon balance seal is used. Arrows 27 show the direction of crude oil flow through the valve (although in FIG. 3 the valve is actually shown in a closed position) and it can be seen that the space inside bonnet 15 is connected with the downstream side of valve 10.

Stem 24 carries a co-axial hollow stem extension 36 at its upper end. Stem extension 36 is of generally cylindrical shape and has affixed to its exterior a piston 37 moveable within a cylinder 28. Piston 37 carries piston seals 38 at its upper and lower edges which seal with the inside wall of cylinder 28. Piston seals 38 typically Teflon (Registered Trade Mark) self-energising rings so as to minimize friction. Cylinder 28 is sealed and located at its lower most portion in the upper most part of bonnet 15. At its uppermost portion it locates in and is sealed to a bottom end plate 30 of a spring housing 31 which extends further vertically above the stem extension 36. Cylinder 28 is held rigidly in place by means of cylinder studs 29 which extend parallel to and externally of cylinder 28 and which are threadedly secured in the uppermost surface of bonnet 15. Cylinder studs 29 pass through the bottom end plate 30 and are held in place by cylinder stud nuts 32.

The spring housing 31 is a cylindrical enclosure for a helical compression spring 43. Spring housing 31 terminates at its upper end in top end plate 35, through which pass spring housing retaining bolts 33 which surround the cylindrical spring housing 31. Spring housing retaining bolts 33 pass respectively through the bottom end plate 30 and the top end plate 35 and are secured by spring housing retaining nuts 34.

A hollow spring stem 39 extends vertically within the lower part of helical spring 43 and forms a co-axial continuation of hollow stem extension 36. The external diameters of spring stem 39, stem extension 36 and stem 24 are identical. Helical spring 43 surrounding spring stem 39 is carried at its lower end by bottom spring seat 41 and at its upper end by top spring seat 42. Spring stem 39 is open at its upper end into the hollow interior of spring adjusting screw 40 which extends through the top end plate 35 and is associated with a spring compression setting assembly 44 which is located above and outside top end plate 35. A proximity switch 45 is provided on bottom end plate 30 for sensing remotely e.g. via an electrical signal whether valve 10 is closed or not.

As seen in FIG. 3 a number of fluid entry and exit ports are provided in valve body 11, its associated bonnet 15 and the principal actuator gear located above valve 10. In the upper part of body 11 on the upstream side of the valve is an upstream fluid tapping 50. As seen in FIG. 1 this connects with a control fluid line 51 which in turn connects to a fluid control circuit 80 which is bolted onto bonnet 15 and also secured to the bottom end plate 30 of spring housing 31. There are also two fluid control tappings in the uppermost part of bonnet 15. These are shown as passageway 53 which communicates with the lower interior of cylinder 28 and passageway 55 which communicates with the interior of bonnet 15. A further passageway 54 is provided in bottom end plate 30 and communicates with the upper interior of cylinder 28.

The control equipment associated with valve 10 and its principal actuation equipment is shown within dashed line 80 in FIG. 4. The control circuit 80 has no external power supply and is actuated solely by changes in pressure from the crude oil within the pipeline connected to valve 10. Line 60 is connected to the main pipeline at its closest point to valve 10 by means of a two inch line so as to provide as small a pressure drop as is practical between the main pipeline tapping and valve 10. Fluid in line 60 may pass through valve 61 which is a media filter and isolation valve and through a further isolation valve 62 before entering a pilot operated three-way valve 63. Valve 63 is set for actuation at 50 PSI decreasing, and the actuation is by way of pilot line 68 responding to changes in line pressure in line 60. Associated with line 60 is a by-pass line 64 (to provide a dual or redundant filter system for on-line maintenance purposes) which also has an isolation/media filter valve 65 and isolation valve 66 before being connected via line 67 back into line 60. The outlet port of valve 63 is connected via line 69 to passageway 53 in the bonnet 15 of valve 10. Thus the underside of piston 37 is normally subject to the pressure in line 60 transmitted via line 69. Also connected to the outlet port of line 63 is line 70 which continues to a pressure reducing regulator 52. Valve 52 is a Series 9000 valve manufactured by Keane Controls of Anaheim, Calif., the salient features of which will be described later in this specification. There is a spur 71 from line 70 which serves to actuate valve 52. When or if supply line 60 to 3-way valve 63 breaks, the supply line is then line 51. If the pressure in line 60 drops below 50 psi, valve 63 will select line 51. A check valve, or non-return valve, 99 will block any leakage through line 60.

Valve 52 has fluid outlet lines 72 and 75. Line 72 passes via a back pressure regulator 73 and line 74 to passageway 55 in bonnet 15 in valve 10. An outlet of valve 52 is thus connected to the downstream side of valve 10 since the space inside bonnet 15 is at downstream condition. Back pressure regulator 73 is pilot operated by change in pressure in line 72 and is typically set for actuation at 520 PSI. Regulator 73 must be set at a pressure above the maximum outlet pressure of valve 10 and below the maximum pipeline surge pressure. The other exit line 75 from valve 52 passes via a one way flow regulator 76 to passage 54 in the bottom end plate 30 of spring housing 31 of valve 10. Flow regulator 76 incorporates a speed control valve set as variable over a range of 4 to 30 seconds. Line 75 is thus connected to the space within cylinder 28 and acts on the uppermost side of piston 37.

Figure 5:
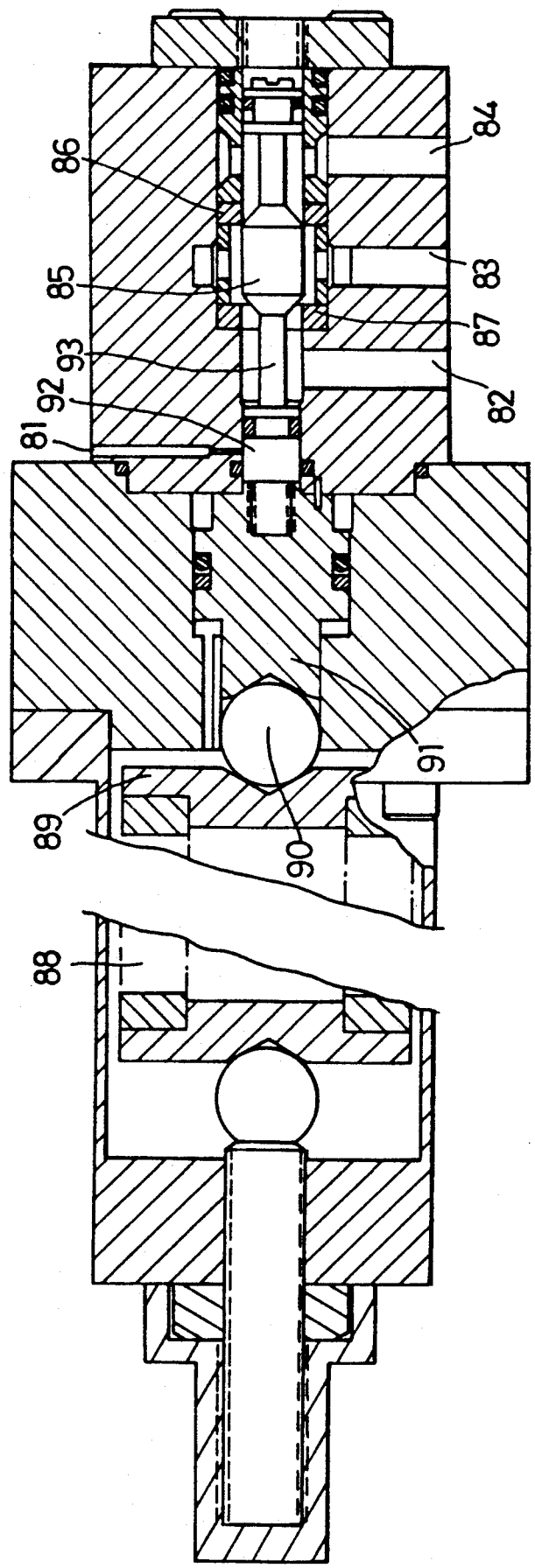
FIG. 5 shows in cross-section part of the control equipment illustrated schematically in FIG. 4.

FIG. 5 shows valve 52, a pressure reducing regulator, in more detail. Regulator 52 is a Series 9000 Keane valve in which the compression spring 88 has been selected for a specific range of pipeline upset pressures, in this instance, 824 to 854 psi. The spring has a range of 800 to 850 psi and its final setting is to be determined by test. It is estimated that the setting will be 810 PSI increasing for this application. The valve is otherwise a standard valve. By force transmitted through spring seat 89, ball 90, regulator piston 91 and end member 92, regulator spring 88 holds stem 93 and associated spool 85 with spool 85 in its furthermost position towards the right as seen in FIG. 5. Associated with spool 85 are seats 86 and 87. With spool 85 in its furthest right position, spool 85 engages against seat 86.

Regulator 52 has three ports connecting with the space associated with spool 85. As seen in FIG. 4, port 82 connects with line 70, port 83 connects with line 75 and port 84 connects with line 72. Line 71 connects with port 81 which provides for pilot actuation of regulator 52.

Under operating conditions with the crude oil upstream pipeline pressure at say 800 PSI, the upstream pipeline pressure is transmitted through line 60, line 69 and passageway 53 into cylinder 28 on the underside of actuating piston 37. Indeed the fluid pressure acting on the underside of piston 37 will always be the upstream line pressure. At the same time the pressure in cylinder 28 above piston 37 is equalised via line 75 with the spool 85 in the position shown in FIG. 5. There is thus no net force on piston 37 and the position of plug 22 is that it remains closed under the force of spring 43 which by means of spring compression setting assembly 44 is set at 824 PSI increasing. As a surge develops, the upstream line pressure increases to 810 PSI regulator piston 91 is forced to move against regulator spring 88 thereby moving spool 85 away from seat 86 and permitting fluid to flow from both ports 82 and 83 into port 84. Regulator 52 thus permits venting of oil from cylinder 28 above piston 37 through passageway 54 and line 75 and port 83. This oil passes through regulator 52 and is vented via line 74 and passageway 55 into bonnet 15 of valve 10.

Between 810 PSI and 824 PSI upstream oil pipeline pressure a portion of the oil vented from above the piston 37 via line 75 goes to the bonnet 15 via line 74 whilst line pressure remains applied to the underside of piston 37 via line 70 and 69. This causes the actuating mechanism to reduce the seating force of plug 22 and seal seat 18, and at 824 psi to lift stem 24 and hence plug 22, opening the valve 10 to fluid flow through disc stack 20 to a suitable dump downstream of valve 10. At upstream pipeline pressure of 854 PSI spool 85 is pulled by regulator piston 91 into engagement with seat 87 (see FIG. 5A) thus cutting off port 82 and opening to a maximum the area within regulator 52 for oil to flow from port 83 to port 84. This permits the pressure on the upper side of piston 37 to be reduced at its maximum rate, causing piston 37 to rise under line pressure as quickly as possible. Valve 10 thus starts to open at 824 psi and is fully open at 854 psi. Regulator 52 proportions the fluid flow over this range, reducing the pressure from above piston 37 proportional to the upset.

In order to prevent variable line pressure downstream of valve 10 from affecting the actuation of the valve 10, downstream pressure is present throughout hollow stem 24, stem extension 26, spring stem 39 and within the hollow interior of spring adjusting screw 40 which forms a cylinder within which spring stem 39 can move. No matter what the position of the plug 22 in its axial movement, the presence of downstream pressure acting on surfaces in these items results in a balancing effect upon the stem. A further alternative arrangement to providing valve stem balancing means would be to run an external line out of bonnet 15 into the spring adjusting screw and cylinder 40, such line transmitting fluid pressure from one region to the other. Downstream pressures may vary from 5 to over 400 PSI depending upon downstream conditions.

Figure 5A:
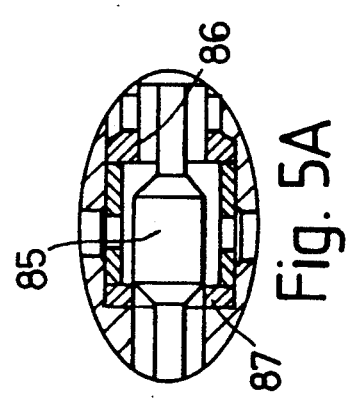
FIG. 5A shows a detail in cross-section of part of FIG. 5 illustrating a different position of part of the control equipment shown in FIG. 5.

The operation of regulator 52 with spool 85 capable of movement between the position shown in FIG. 5 and the position shown in FIG. 5A against 810 PSI spring loading of this valve, permits smooth and effective operation of the piston 37 and cylinder 28 device which in turn enables plug 22 to be withdrawn from valve 10 with minimum risk of violent vibration and cavitation. The invention also permits effective modulated control of surging without any external power source.

In the event of loss of pressure signal in line 60 from the upstream side of valve 10, there remains normally redundant line 51 connected to tapping 50 into valve bonnet 15. If both lines 60 and 51 are disabled, the pressure drop in line 70 will result in spool 85 in pressure reducing regulator 52 moving to the position shown in FIG. 5A. In these circumstances, valve 10 will fail in its closed position.

What we claim is:

1. A valve for a pipeline, said valve comprising:
   a valve body having a fluid inlet and fluid outlet, said valve body housing a trim cage assembly defining a bore in communication with said fluid outlet and further defining a plurality of tortuous path fluid flow passageways leading from said bore to said fluid inlet, said passageways serving to cause energy losses in fluid passing through the valve in its open position;
   a plug carried on a stem, said stem extending externally of the housing; and
   control means acting on said stem to provide movement of said plug axially within said bore from a valve closed position, in which closed position said plug is held by resilient means against a seat carried by said valve body thereby closing said fluid outlet, through valve open positions in which the plug exposes varying areas of said fluid flow passageways to the bore, thereby varying the amount of fluid flowing through the valve from said fluid inlet to said fluid outlet via said passageways;

said control means incorporating a control device and fluid connection means adapted to connect said control device to said pipeline stream of the valve, said control device being responsive to changes in fluid pressure upstream of said valve to actuate the control means and hence control the position of the stem and plug relative to said seat, substantially in proportion to changes in said fluid pressure;

whereby said fluid control means is adapted to require only energy associated with the fluid pressure in the pipeline in order to actuate the valve.

2. A valve as claimed in claim 1 in which the plug has diametrically spaced passageways passing through said plug parallel to the stem, sufficient to provide balancing of the plug by ensuring equal fluid force applied to either side of the plug.

3. A valve as claimed in claim 1 or claim 2 in which the valve trim cage assembly comprises a stack of discs, each disc incorporating at least one passageway capable of absorbing energy from the fluid.

4. A valve as claimed in claim 1 wherein stem balancing means is provided such that any force due to fluid pressure acting on the stem is equalised thereby minimizing the effect of change in fluid pressure in the valve from affecting the position of the stem.

5. A valve as claimed in claim 4 wherein the stem is hollow so as to permit fluid pressure to be transmitted to its end to act on an equal area of stem as is exposed to fluid pressure as the stem leaves the valve housing.

6. A valve as claimed in claim 4 in which the stem balancing means incorporates a projection extending from the plug in a direction away from the stem and passing through the valve housing, the cross-sectional area of said extension at the position where it leaves said housing being identical to that of the stem where the stem leaves said housing.

7. A valve as claimed in claim 1 in which the control means acting on the stem includes a piston attached to the stem, said piston being moveable within a cylinder, said control means further including a pressure reducing regulator incorporating a spool, said spool being moveable in proportion to changes in fluid pressure to provide proportional venting of the cylinder associated with said piston to permit said piston, and hence said stem and said plug, to move to a valve open position.

8. A valve as claimed in claim 7 in which said pressure reducing regulator is connected to the upstream fluid supply via a 3-way valve actuated by changes in fluid pressure.

9. A valve as claimed in claim 1 adapted to be located in a branch line from a main fluid pipeline, said fluid connection means being adapted to receive a connection from the main fluid pipeline.

10. A valve as claimed in claim 1 incorporating a normally redundant connection to the upstream side of the valve housing into said control means, said connection providing a passageway to respond to upstream pressure in the event that said fluid connection means is obstructed.

11. A valve as claimed in claim 9 incorporating a normally redundant connection to the upstream side of the valve housing into said control means, said connection providing a passageway to enable the control means to respond to upstream pressure in the branch line in the event that the connection to the main pipeline is obstructed.

* * * * *